B. BROOKS.
CYCLE, MOTOR CYCLE, AND ANALOGOUS SADDLE.
APPLICATION FILED AUG. 11, 1921.

1,416,942.

Patented May 23, 1922.
2 SHEETS—SHEET 1.

Inventor:
Boultbee Brooks.
by Richard Geier
Attorneys

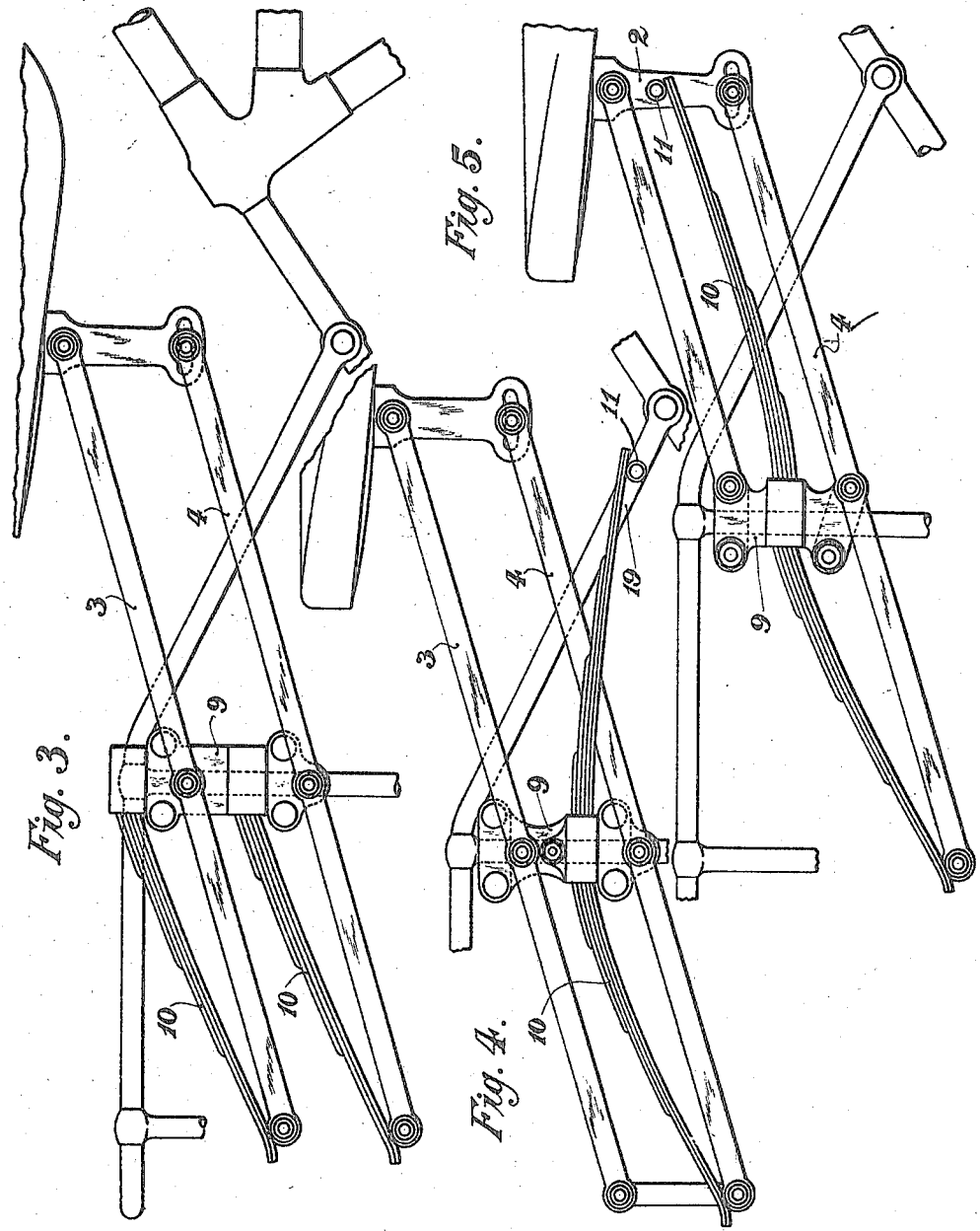

UNITED STATES PATENT OFFICE.

BOULTBEE BROOKS, OF BIRMINGHAM, ENGLAND, ASSIGNOR TO J. B. BROOKS AND COMPANY LIMITED, OF BIRMINGHAM, ENGLAND.

CYCLE, MOTOR-CYCLE, AND ANALOGOUS SADDLE.

1,416,942. Specification of Letters Patent. Patented May 23, 1922.

Application filed August 11, 1921. Serial No. 491,361.

(GRANTED UNDER THE PROVISIONS OF THE ACT OF MARCH 3, 1921, 41 STAT. L., 1313.)

*To all whom it may concern:*

Be it known that I, BOULTBEE BROOKS, subject of the King of Great Britain, residing at Birmingham, England, have invented certain new and useful Improvements Relating to Cycle, Motor-Cycle, and Analogous Saddles (for which I have filed application in Great Britain on the 1st day of April, 1920, Nos. 9396/20 and 9397/20 resulting in Patent No. 164,898), of which the following is a specification.

This invention relates to improvements in motor-cycle, cycle and analogous saddles of that type in which the seat proper is mounted upon a system of parallel-motion members combined with a spring. The object of the present invention is to provide an improved construction of this type of mounting.

According to the invention the saddle top is mounted at each side upon a pair of parallel-motion links pivoted to a fixed part of the machine, and acted upon by laminated leaf springs.

Figure 1 of the accompanying drawings is a side elevation of a saddle mounted in accordance with this invention, the saddle being supported at each side by a pair of parallel-motion links, each pair of links being acted upon by a quarter-elliptic laminated leaf spring disposed between them.

Figure 3 shows a further arrangement in which a quarter elliptic leaf spring is arranged to bear upon an extension of each of the link members.

Figure 4 is an elevational view in which an extension of the lower link of each pair of parallel-motion members is acted upon by a semi-elliptic laminated leaf spring pivoted at its middle.

Figure 5 shows an arrangement in which each pair of parallel-motion links are acted upon by both ends of a laminated leaf spring, rigidly fixed at the middle.

The same reference numerals indicate corresponding parts in each of the figures.

Figure 1:
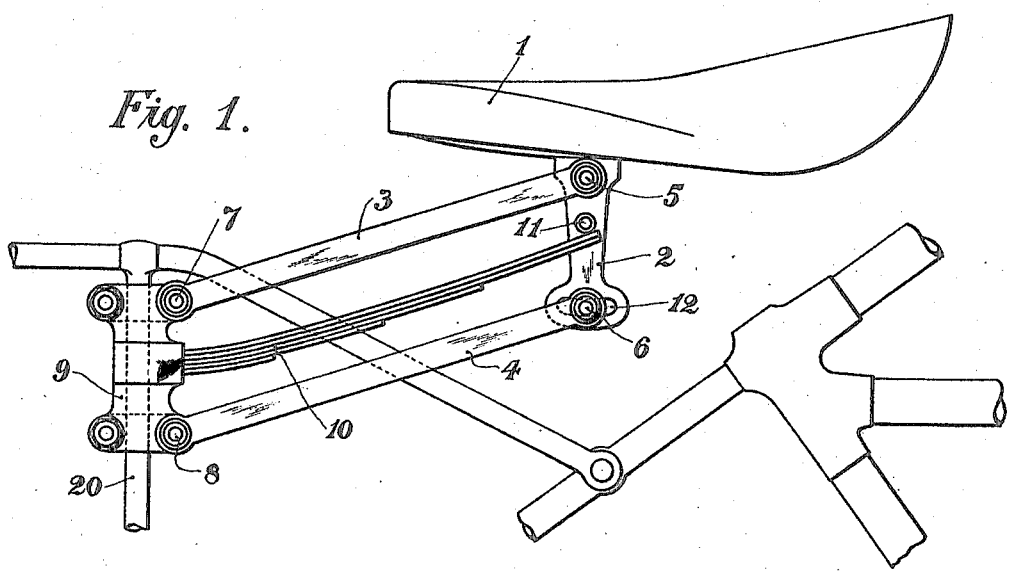

Referring to Figure 1 of the drawings, the saddle top 1 carries at each side a depending bracket member 2, each bracket member being hinged to the forward ends of a pair of superimposed parallel-motion link members 3 and 4. The said forward ends of each pair of link members are hinged respectively to vertically separated pivot pins 5 and 6 upon the respective bracket member whilst the rear ends of each pair of links are pivoted at two vertical separated points, at 7 and 8, to an attachment plate 9 fixed to the vertical stay 20 at each side of the carrier of the machine. Rigidly fixed at its rear end to each of the attachment plates 9 is a quarter-elliptic laminated leaf spring 10 whose forward end is arranged to engage with the underside of a pin 11 fixed to the depending bracket member 2 of the saddle, each spring lying between the respective link members 3 and 4 and in substantially the same vertical plane as the latter.

To admit of the saddle top 1 being adjusted angularly the pivot pin 6 to which the forward end of the lower link member 4 is hinged may be adjustable within a curved slot 12 in the lower end of the bracket 2, as shown, or other suitable means may be employed for adjusting the tilt of the saddle. To limit the upward movement of the saddle the spring 10, or one of the links, may be arranged to engage with a stop upon a fixed part of the machine.

Figure 2:
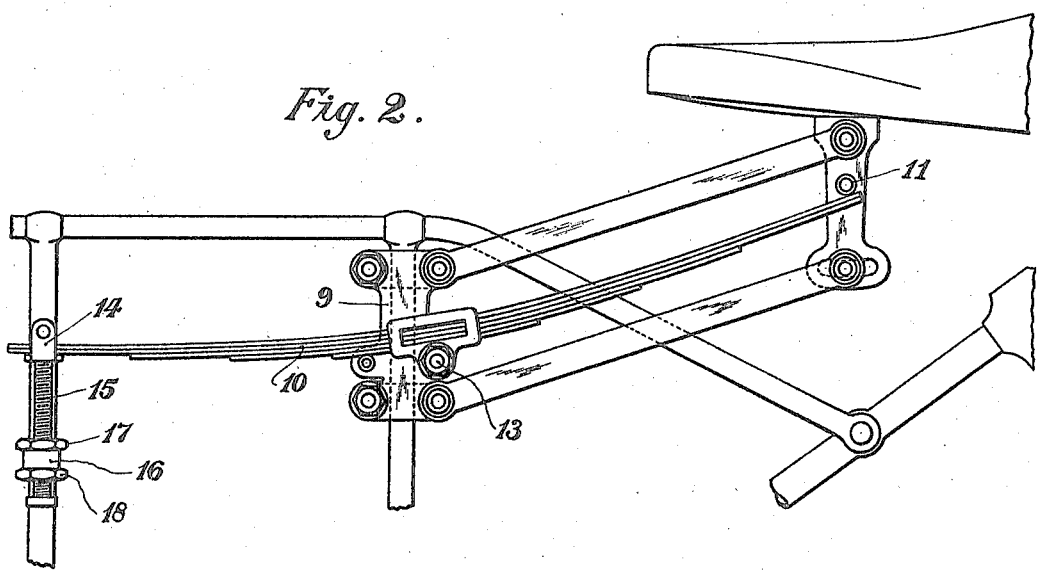
Figure 2 shows another arrangement in which a semi-elliptic laminated leaf spring is arranged between each pair of parallel motion links, the spring being fulcrumed at its middle.

Instead of a quarter-elliptic spring being employed a semi-elliptic spring 10 may be used, as shown in Figure 2, the said spring being pivoted at its middle, at 13, to the attachment plate 9 upon the carrier, its forward end being arranged to bear upon the underside of a stud or roller 11 upon the depending bracket member, whilst its rear extremity is secured to a U-shaped support 14 carried by a screwed rod 15 passing through a sleeve 16 fixed to the carrier of the machine the height of the rod being capable of being adjusted by nuts 17, 18. The tension of the spring may thus be readily altered to suit the weight of different riders. The upward movement of the saddle may be limited by means of a stop 21 which engages with the underside of the rear half of the spring 10.

Referring to the arrangement shown in

Figure 3 of the drawings, the links 3 and 4 may be extended rearwards past the points at which they are hinged to the attachment plate 9, whilst the rear extremities of the said extended portions are each acted upon by the rear end of a separate quarter-elliptic spring 10, whose forward end is clamped to the attachment plate 9, the spring being arranged immediately above the extension of the respective link member.

As shown in Figure 4, a semi-elliptic laminated leaf spring 10 may be employed, pivoted at its middle to the attachment plate 9 upon the carrier, the links 3 and 4 being extended rearwards in the manner above described. The rear extremity of the spring 10 is arranged to bear upon the extremity of the rear extension of the lower link 4, whilst the forward end of the spring is arranged to bear upon the upper side of a stud or roller 11 upon the attachment stay 19 of the carrier, or upon some other suitable fixed part of the machine.

If desired a laminated leaf spring 10 of the construction shown in Figure 5 may be employed, the said spring being rigidly fixed at its middle to the attachment plate 9 upon the carrier. The rear end of the spring is arranged to bear upon an extension of the lower link 4 whilst its forward end bears against the underside of a stud 11 upon the respective bracket member 2 of the saddle.

In any of the above arrangements suitable means may be employed if desired to admit of the tension or compression of the springs being adjusted, and also to limit the upward movement of the saddle.

Having fully described my invention, what I desire to claim and secure by Letters Patent is:—

1. A cycle saddle comprising a saddle top, an attachment bracket, means for securing the attachment bracket to the carrier of the machine, depending members carried by the saddle top, parallel-motion links carried by the attachment bracket and connected to the depending members, and a leaf spring carried by the attachment bracket and supporting the saddle top.

2. A motor-cycle, cycle and analogous saddle comprising a saddle-top mounted at each side upon a pair of parallel-motion links, means for pivoting the said links to a fixed part of the machine, and a laminated leaf spring disposed between each pair of links and adapted to act upon and support the same.

3. A motor-cycle, cycle and analogous saddle comprising a saddle top mounted at each side upon a pair of parallel motion links, means for pivoting the said links to a fixed part of the machine, a semi-elliptic laminated leaf spring disposed between each pair of the said links and adapted to act upon and support the same, and means for pivoting the said springs at about their middle to a fixed part of the machine.

4. A motor-cycle, cycle and analogous saddle comprising a saddle top mounted at each side upon a pair of parallel motion links, means for pivoting the said links to a fixed part of the machine, a semi-elliptic laminated leaf spring disposed between each pair of the said links and adapted to act upon and support the same; means for pivoting the said springs at about their middle to a fixed part of the machine and means for adjusting the tension upon the springs to suit the varying weights of different riders.

5. A cycle saddle comprising a saddle top mounted upon parallel motion links arranged in upper and lower planes, means for pivoting the said links to a fixed part of the machine, and leaf springs disposed between said upper and lower links and adapted to support the saddle top.

In testimony whereof I have hereunto set my hand in presence of two subscribing witnesses.

BOULTBEE BROOKS.

Witnesses:
 KENNETH G. O. COATES,
 HARRY OSMOND PRATT.